United States Patent Office 3,549,566
Patented Dec. 22, 1970

3,549,566
AQUEOUS DISPERSION PAINT COMPOSITIONS HAVING IMPROVED BRUSHING CHARACTERISTICS
Michael E. Mesirov, Claymont, Del., assignor to E. I. du Pont de Nemours and Company, Wilmington, Del., a corporation of Delaware
No Drawing. Filed Nov. 21, 1967, Ser. No. 684,616
Int. Cl. C09d 5/02; C08f 29/36
U.S. Cl. 260—8                                9 Claims

ABSTRACT OF THE DISCLOSURE

An aqueous polymeric dispersion, useful as a pigmented or clear coating composition, which has increased brushing viscosity is disclosed. Higher brushing viscosity is obtained by adding to the dispersion the combination of a thickener and a polymeric aziridine compound.

BACKGROUND OF THE INVENTION

This invention relates broadly to aqueous polymeric dispersions and more particularly to latex paints. As used for this invention, the term "latex" means an aqueous dispersion of a water-insoluble polymer which is present in the form of very fine particles.

A main characteristic of latex paints is their low brushing viscosity when contrasted to oil based paints. Brushing viscosity is the viscosity of the paint measured at typical brushing shear rates which are very high. Brushing viscosity data are measured at a shear rate in the range of 10,000–15,000 sec.$^{-1}$ for purposes of this invention.

Typical latex paints have a brushing viscosity of about 0.4–0.6 poise while oil paints have a brushing viscosity of about 2.5–4.0 poise. The low brushing viscosity of latex paints is desirable because it allows the paint to be brushed out with a minimum of effort. This ease of application, however, can result in the paint being brushed out too thin which results in poor one-coat hiding and reduced durability. Preferably, latex paints should have brushing viscosities in the range of about 0.6–1.2. Brushing viscosities in this range force the painter to apply a thicker coat of paint without any noticeable increase in the amount of effort expended.

SUMMARY OF THE INVENTION

According to this invention, there is provided an aqueous polymeric dispersion coating composition which comprises a dispersed phase of a water-insoluble negatively charged carboxylic vinyl addition polymer which contains from about 0.3% to about 10% by weight of α,β-unsaturated monovinylidene carboxylic acid units attached to the polymer backbone, the polymer being dispersed in an aqueous medium. The aqueous polymeric dispersion coating composition also contains at least about 0.5% by weight thickener and at least about 0.2% by weight of a polymeric aziridine compound, both percentages being based on the total amount of dispersed polymer solids present.

This composition has the advantage of resulting in a better balance of properties because the brushing viscosity is raised to a level which allows it to be easily applied but which results in a thicker coating of paint being applied. The thicker pain film applied in turn results in good one coat hiding, good durability and other improved film properties. Another advantage is that the other desirable application properties such as can viscosity, can stability, freeze-thaw resistance and water clean-up of the latices are not harmed.

The increased brushing viscosity of this invention is obtained by adding to the aqueous carboxylic vinyl addition polymer dispersion both a thickener and a water-soluble polymeric aziridine compound. No applicable increase in brushing viscosity is realized unless both are present.

For purposes of this invention, the term thickener means a compound which is used to build up the can viscosity. Thickeners are usually low molecular weight (below 100,000) polymeric materials although they can have higher molecular weights for some purposes. Their characteristic feature is that they form high viscosity solutions at very low solids. Some examples of thickeners suitable for use in practicing this invention are listed below along with at least one tradename or trademark and commercial source for each.

| Tradename or Trademark | Source | Composition |
|---|---|---|
| "Thickener" LN | General Aniline & Film Co | Ammonium salt of a polymer of vinyl methyl ether and maleic anhydride also containing a nonionic surfactant of the alkyl polyethyleneoxy type. |
| "Thickener" L | do | Potassium salt of above composition. |
| "Methocel" | Dow Chemical Co | Carboxy methyl cellulose. |
| "Cellosize" | Union Carbide Corp | Hydroxy ethyl cellulose. |
| "Acrysols" | Rohm & Haas Co | Polyacrylic acids. |
|  | National Casein Company | Casein. |

Some increase in brushing viscosity is achieved if any amount of thickener is added to the latex dispersion with a polyaziridine compound, but to achieve good results it is preferred to add between about 0.8% and about 2.3% by weight based on the dispersed polymer. This preferred range results in a paint composition which has an excellent balance of brush and can viscosities. It must be realized, however, that the limits on the amount of thickener present depend on the thickener used and on the concentration of carboxylic acid present. For instance, from about 0.5% to about 2.0% of "Methocel" can be used while from about 0.6% to about 3.3% "Thickener" LN can be used. If higher amounts of these thickeners are used, the paint becomes too viscuous and will not easily flow, while amounts below these limits do not provide a sufficient thickening effect and result in a paint which drips too much. An amount of "Methocel" of about 0.8% to about 1.4% and an amount of "Thickener" LN of about 0.9% to about 2.3% are preferred for the reasons mentioned above.

The other necessary constituent to obtain the benefits of this invention is a water-soluble polymeric aziridine compound. Examples of suitable water-soluble polymeric aziridines include polyethylenimine and polypropylenimine. Both of these compounds are commercially available from the Dow Chemical Co. as 50% aqueous solutions in varying molecular weights.

In general, the amount of polyaziridine added depends upon the carboxylic acid content of the paint, the particular thickener present, and the molecular weight of the polymeric aziridine. Higher molecular weight aziridines have a greater effect on paint viscosity than their low molecular weight counterparts. For polyaziridines having molecular weights of 1000–5000, a suitable amount is between about 0.3% and about 4.0% by weight with the preferred amount being about 0.5% to about 3.0% by weight. For polyaziridines having molecular weights of 50,000–100,000, a suitable amount is between about 0.2% and about 1.5% by weight with the preferred amount being about 0.4% to about 0.8% by weight. Amounts in the preferred ranges give paints with an excellent balance of can and brush viscosities. These ranges also help to provide economical paints because of the low amounts of relatively expensive polyaziridines used. Amounts higher than the specified ranges tend to lower the freeze-thaw stability of the paint compositions and amounts below the specified ranges do not result in an appreciable increase in the brushing viscosity when they are combined with thickeners.

The terms "polyethylenimine" and "polypropylenimine" are used for purposes of this invention to include the simple derivatives of these compounds such as result when the aziridine ring of the monomer is substituted with lower alkyl groups such as methyl, ethyl, propyl and butyl, lower alkoxy groups such as methoxy, ethoxy, propoxy, and butoxy, and other simple substituents. For a more detailed description of some examples of suitable monomers for preparing polyethylenimines and polypropylenimines useful for this invention, see Christenson et al., U.S. Pat. 3,290,416, issued Dec. 6, 1966, particularly at col. 2, line 63 to col. 3, line 29.

The polymers which are suitable for use with this invention are generically designated as carboxylic vinyl addition polymers. The term "carboxylic vinyl addition polymer" means a substantially water-insoluble interpolymer containing pendant carboxylic acid groups (—COOH), or salts thereof (e.g. —COONH$_4$). Such an interpolymer is the product of reacting at least one monomer containing both a carboxylic acid group (or equivalent source of carboxyl groups) and a vinyl linkage (polymerizable olefinic unsaturation) with at least one other vinyl monomer copolymerizable therewith.

The carboxylic polymer latex can be prepared by known methods of emulsion polymerization wherein a carboxylic acid monomer is reacted in an aqueous medium with a copolymerizable non-carboxylic monomer, for example, an alkyl ester of acrylic or methacrylic acid in which the alkyl group contains 1–12 carbon atoms, styrene, alkyl-substituted styrene, vinyl chloride, vinyl acetate, ethylene, a conjugated diene having 4–10 carbon atoms such as butadiene, acrylonitrile or a blend of two or more such monomers. A non-acid monomer component containing a substantial proportion (over 30%) of an alkyl methacrylate is especially useful when the product is to be used in adherence with a polyvinyl fluoride layer or in an application requiring good resistance to extended outdoor exposure. If desirable, the reaction can be carried out under pressure.

It is usually preferred to use either methacrylic acid, acrylic acid or mixtures thereof as the monomer containing a carboxylic group for preparing the carboxylic polymer. Also useful, however, are other olefinically-unsaturated carboxylic acids possessing one or more olefinic carbon-to-carbon double bonds and one or more carboxyl groups. Preferably, the carboxylic acid should contain at least one activated olefinic carbon-to-carbon double bond of a type which readily functions in an addition polymerization. That is, it should contain either (1) a double bond in the alpha-beta position with respect to a carboxyl group (—CH=CH—COOH), or (2) a double bond attached to a terminal methylene grouping (CH$_2$=C).

The following acid monomers exemplify members of the number (1) group: crotonic acid, angelic acid, hydrosorbic acid, cinnamic acid, m-chlorocinnamic acid, p-chlorocinnamic acid, alpha-cyano cinnamic acid, ubellic acid, and other monoolefinic monocarboxylic acids; sorbic acid, alpha-methyl sorbic acid, alpha-ethyl sorbic acid, alpha-chloro sorbic acid, alpha-methyl-gamma benzal crotonic acid, beta(2-butenyl)acrylic acid, 2,4-heptadieneoic acid, 2,4-pentadienoic acid, 2,4,6-octatrienoic acid, 1-carboxyl-1-ethyl-4-phenyl butadiene-1,3,2,6-dimethyl decatriene-(2,6,8)-oic-10, alpha-beta isopropylidene propionic acid, alpha-vinyl cinnamic acid, alpha-isopropenyl-furfural acetic acid, alpha-isopropenyl-cinnamenyl acrylic acid, and other polyolefinic monocarboxylic acids; hydromuconic acid, glutaconic acid, maleic acid, fumaric acid, citraconic acid, and other monoolefinic polycarboxylic acids; 3-carboxypentadiene-(2,4-)oic-1, muconic acid and other polyolefinic polycarboxylic acids.

The following acid monomers exemplify members of the number (2) group: acrylic acid, alpha-chloro acrylic acid, methacrylic acid, ethacrylic acid, alpha isopropylidene acrylic acid, alpha-styryl acrylic acid (2-carboxy-4-phenyl butadiene-1,3), beta-vinyl arylic acid (1-carboxy butadiene-1,3), alpha-vinyl acrylic acid, beta-acryloxy propionic acid, itaconic acid and others. It is preferred to use a monoolefinic monocarboxylic acid having its olefinic double bond in the alpha-beta position with respect to the carboxyl group an containing a terminal methylene group because these are readily available, economical and form suitable addition polymers.

One of the carboxylic vinyl addition polymers preferred for use with this invention contains from about 75% to about 97% by weight vinyl acetate and at least about 3% by weight ethylene with the balance up to 100% being provided by any of the previously mentioned monomers containing at least one carboxylic acid group. A particularly preferred polymer is prepared from about 82% to about 89.7% vinyl acetate, from about 10% to about 16% ethylene and from about 0.3% to about 2% acrylic acid.

The carboxyl groups can also be introduced into the essential interpolymer from a carboxyl-supplying reagent such as maleic anhydride or monosodium oxalate by the method disclosed in Brown, U.S. 2,662,874, issued Dec. 15, 1953 (e.g., in column 3, line 34 and column 4, line 8), or from a reagent containing groups hydrolyzable to carboxyl groups by the method disclosed in Brown, U.S. 2,710,292, issued June 7, 1955.

Typical of the known methods of making a carboxylic polymer latex useful in the practice of this invention are those described in U.S. patents: Semon, U.S. 2,395,017, issued Feb. 19, 1946; Brown, U.S. 2,724,707, issued Nov. 22, 1955; Sanders, U.S. 2,787,603, issued Apr. 2, 1957; Frazier et al., U.S. 2,868,752, issued Jan. 13, 1959; Eilbeck et al., U.S. 2,868,754, issued Jan. 13, 1959; Hornibrook, U.S. 2,918,391, issued Dec. 22, 1959; Sanderson, U.S. 3,032,521, issued May 1, 1962; Simms, U.S. 3,261,796, issued July 19, 1966; McDowell et al., U.S. 3,261,797, issued July 19, 1966; Roedel, U.S. 2,703,794, issued Mar. 8, 1965; Mann et al., U.S. Pat. 3,345,318, issued Oct. 3, 1967; Funck et al., U.S. 3,296,172, issued Jan. 3, 1967; Werner, U.S. 3,282,879, issued Nov. 1, 1966; and Abere, U.S. 3,316,202, issued Apr. 25, 1967; and German disclosure 1,127,085; the disclosures of which are incorporated herein by reference. Especially pertinent is the method described in U.S. 2,274,707, col. 5, line 21 to col. 6, line 60.

For purposes of this invention, a carboxylic vinyl addition polymer is utilized having about 0.3% to about 10% by weight and preferably about 1–5% by weight of monomer units containing alpha, beta unsaturated monovinylidene carboxylic acid groups. In any event, sufficient anionic carboxylic acid radicals (—COO— groups) must be present to impart to the polymer an overall negative charge. Amounts above about 10% can result in gelation of the polymer while amounts below about 0.3% tend to lower the freeze-thaw stability of the paint composition. When the carboxylic acid groups are present in the preferred range, the paint has excellent freeze-thaw stability and a good balance between its can and brushing viscosities.

The acid content of the carboxylic polymer can be determined by separating the polymer from the aqueous phase, dissolving it in a solvent and titrating the resulting polymer solution with alcoholic KOH to a phenolphthalein end-point. The acid content can also be determined by complete chemical analysis of the polymer.

The carboxylic polymer is produced in any molecular weight that fits the intended use of the final product, usually above about 100,000 and frequently above about 1,000,000.

The carboxylic vinyl addition polymers can be further treated by any of the processes known in the art. For example, they can be iminated to provide improved wet adhesion as taught in Simms, U.S. 3,261,796, issued July 19, 1966, or can be treated to give them pendant monovalent radicals of the aminoester or hydroxyamide type to improve their freeze-thaw stability as taught by McDowell et al., U.S. 3,261,797, issued July 19, 1966. The disclosures of these two references are incorporated herein by reference for purposes of illustrating such treatments.

The emulsion used in preparing the carboxylic polymer latex is composed of the mixture of monomers, suitable emulsification and suspension agents (surfactants), buffering agents for pH control and a free radical catalyst; for example, potassium persulfate, a peroxide such as hydrogen peroxide, a diazo compound such as azobisisobutyroamidine hydrochloride or a redox type such as persulfate-sulfite, or mixtures of such catalysts. Polymerization can be carried out in the presence of a free radical catalyst in a closed vessel in an inert atmosphere and under autogeneous pressure or under artificially induced pressure particularly when ethylene is a comonomer or in an open vessel under reflux at atmospheric pressure. The temperatures of the polymerization can be varied from 0° C. or lower to 100° C. or higher, preferably from 20° C. to 90° C., depending to a large degree upon the activity of the monomers and catalyst used and the molecular weight desired in the polymeric product.

The carboxylic acid monomer is preferably included in the emulsion reaction mixture in an amount sufficient to result in a carboxylic polymer into which about 0.1%–2% by weight amino or amido nitrogen (by weight of polymer) can be introduced during a subsequent imination reaction. Generally, the carboxylic polymer should have an acid equivalent of about 0.001 to 3.0, preferably 0.05 to 2.3, and even more preferably about 0.1 to 1.0 milliequivalents per gram (dry basis). In the interest of obtaining a substantially water-insoluble carboxylic polymer and a stable latex product, it is usually best to add less than about 10%, preferably less than about 5%, acid monomer based on the total weight of monomer in the reaction mixture.

To form a pigmented coating composition from the novel polymer dispersions, any of the ordinary water-insoluble inorganic and organic paint pigments well known in the art can be used with these novel dispersions. Examples of suitable pigments include titanium dioxide, carbon black, "Monastral" red, blue or green, ferrite yellow and red iron oxide. However, the relative amount and type of pigment in the latex binder has a significant effect on the properties of the paint. A pigment volume concentration of about 4% is about the minimum proportion of pigment which will provide a paint which has a practical hiding power. The maximum proportion of pigment volume concentration is about 70%. Preferably, however, a pigment volume concentration in the range of about 4–60% is desirable. Pigment volume concentration is the ratio expressed on a percent basis of the volume of pigment to the total volume of pigment plus film-forming materials of the compositions; the "volume of pigment" is the volume of vehicle displaced by the pigment wet with vehicle.

Various auxiliary agents which are normally used in latex base paints can also be added including defoaming agents, such as tributyl phosphate or waxes, humectants, such as ethylene glycol or water-soluble gums and bactericides or fungicides, such as borax.

To keep pigments and other additives dispersed and to make the polymeric dispersions freeze-thaw stable, nonionic surfactants are often used in amounts of about 0.3% or more based on the dispersed polymer. These may be added directly to the latex before the pigments and the additives are mixed with the latex or the nonionic surfactant may be a portion of the mill base or pigment dispersion which is added to the latex. Typical nonionic surfactants which may be used include alkylphenoxypolyethoxyethanols having alkyl groups of about seven to twelve carbon atoms, such as heptylphenoxypolyethoxyethanols, octylphenoxypolyethoxyethanols, methyloxtylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents, such as those made by condensing the required proportion of ethylene oxide with nonyl, dodecyl, tetradecyl mercaptans or with alkylthiophenols having alkyl groups of six or fifteen carbon atoms; ethylene oxide derivatives of long-chained carboxylic acids, such as lauric, myristic, palmitic, oleic, and the like; or mixtures of acids such as found in tall oil; ethylene oxide condensates of long-chained alcohols, such as octyl, decyl, lauryl, or cetyl alcohols, ethylene oxide derivatives of etherified or esterified polyhydroxyl compounds having a hydrophobic hydrocarbon chain, etc. A preferred nonionic surfactant is octyl phenyl polyglycol ether. Numerous additional species of nonionic surfactants useful in this invention are listed in "Synthetic Detergents" by J. W. McCutcheon, published annually by MacNair-Dorland Company, New York.

Anionic surfactants may also be used in preparing the paint compositions of this invention. Some examples of suitable anionic surfactants include sodium lauryl sulfate, soluble alkali metal and ammonium salts of half esters of sulfurc acids with long-chain fatty alcohols, water soluble polyalkylene oxide derivatives having an anionic group, alkyl aryl sulfonates, sulfated and sulfonated esters and ethers and alkyl sulfonates. Anionic surfactants are usually present in amounts of about 0.05%–10% when they are used.

The aqueous polymeric dispersions of this invention are particularly useful as clear or pigmented coating compositions, such as outdoor and indoor house paints, concrete paints, clear finishes for wood, bowling lane finishes and as clear finishes for metals such as aluminum and chrome.

The following examples illustrate the invention. All parts and percentages are by weight unless otherwise specified.

EXAMPLE 1

An aminoester polymer latex house paint adapted for use on the exterior siding and trim of houses having clapboard or other types of siding is prepared by first following Formula A to make a latex of a carboxylic polymer.

Formula A.—Carboxylic polymer latex

| | Parts by weight |
|---|---|
| Water | 455.0 |
| Portion 1: | |
| Portion 2: | |
| Water | 380.0 |
| Methyl methacrylate | 346.5 |
| 2-ethylhexyl acrylate | 408.0 |
| Methacrylic acid | 15.5 |
| Anionic surfactant, 30% aqueous solution of sodium lauryl sulfate | 25.6 |
| Sodium meta-bisulfite | 0.81 |
| Portion 3: | |
| Potassium persulfate, 10% aqueous solution | 16.94 |
| Portion 4: | |
| Same as Portion 3 | 4.18 |
| Portion 5: | |
| Nonionic surfactant, 50% aqueous solution of "Triton" X-100 (octyl phenyl polyglycol ether) | 92.4 |
| | 1744.93 |

Portion 1 is charged into a conventional polymerization reaction vessel equipped with stirrer, means to control temperature, and means to introduce nitrogen. The polymerization reaction to follow is carried out under nitrogen. Portion 2 is premixed to emulsify the acrylic monomers; 120 parts of this portion are added to the vessel with stirring and the resulting mixture is heated to 65° C. Portion 3 is then added with stirring, the temperature is raised to 74° C., a reaction mixture temperature of 74° C. to 78° C. is maintained for 5 minutes, and while continuing to maintain this temperature, the remainder of Portion 2 is added gradually over a period of 140 minutes. Portion 4 is added and the mixture kept at 74° C. to 78° C. for 90 minutes more. After cooling the resulting interpolymer latex to 25° C., Portion 5 is added with thorough stirring, which is continued for 15 minutes, then the latex is filtered through cheesecloth to remove any coarse coagulum that has formed.

The resulting latex has a polymer content of about 47%, the polymer being a 45:53:2 interpolymer of methyl methacrylate: 2-ethylhexyl acrylate:methacrylic acid. The average diameter of the polymer particles is about 0.1 to 0.2 micron. The polymer has a molecular weight of over 500,000, a relative viscosity of about 1.20, a tensile strength of over 1000 p.s.i. at 0° F. and an elongation of over 180% at 0° F.

The carboxylic polymer is iminated by charging a reaction vessel equipped with stirrer, thermometer, nitrogen inlet, condenser and addition funnel with 1000 parts of the Formula A latex. The reaction to follow is carried out under nitrogen. Propylenimine (non-diluted) is added gradually with stirring at 26° C. in an amount sufficient to esterify 33% of the pendant carboxyl groups of the polymer; the amount actually added is equal to about 100% of the theoretical amount required to esterify all the pendant carboxyl groups. Then the mixture is heated to 58° C. over a period of 30 minutes and the 58° C. temperature is maintained for an additional 60 minutes.

A sharp distinction must be made here between iminating the polymer by reacting propylenimine with the polymer and improving the brushing viscosity of the aqueous dispersion by adding a polymeric aziridine and thickener. The two steps are different and should not be confused with each other.

After the resulting aminoester polymer latex is slowly cooled to 25° C. and the pH is adjusted to 9.5 with dilute ammonia, it is filtered through cheesecloth to remove any coarse coagulum that has formed. Analysis shows that 33% of the pendant carboxyl groups have been converted to aminoester groups during the reaction.

Pigment and various modifiers are added to the Formula A latex in the form of a premixed dispersion prepared according to Formula B.

Formula B.—Pigment dispersion

| | Parts by weight |
|---|---|
| Portion 1: | |
| Talc pigment extender | 10.93 |
| Methyl cellulose, "Methocel" HG | 0.27 |
| Portion 2: Water | 12.21 |
| Portion 3: | |
| Anti-foam agent, "Nopco" 1497V | 0.30 |
| Potassium tripolyphosphate | 0.17 |
| Ammonium hydroxide, 28% NH$_3$ | 0.23 |
| Bodying agent, "Acrysol" A-3 | 0.51 |
| Phenyl mercury oleate, 10% in mineral spirits | 3.24 |
| Ethylene glycol | 2.59 |
| Portion 4. Titanium dioxide pigment | 35.68 |
| Portion 5: | |
| Nonionic surfactant, "Tween" 40 | 0.10 |
| Water | 6.03 |
| Mica pigment extender | 10.93 |
| Portion 6: | |
| Ammonium hydroxide, 28% NH$_3$ | 0.17 |
| Anti-foam agent, "Nopco" 1497V | 0.13 |
| Formula A latex | 8.50 |
| Portion 7: Formula A latex | 8.01 |
| | 100.00 |

In Formula C: "Methocel" HG has a viscosity of 3000 to 5000 centipoises at 20° C., measured on a 2% aqueous solution. "Nopco" 1497V is understood to be composed of 60% anionic sulfated saturated fatty acid, 8% free fatty acid, and 32% inert matter. "Acrysol" A-3 is a 25% aqueous solution of low molecular weight water-soluble polyacrylic acid. The titanium dioxide is an 82:18 blend of rutile and anatase types.

The 7 portions of Formula B are introduced into a mixing tank in the order shown and uniformly blended and dispersed in accordance with conventional procedure for making pigment dispersions for use in latex paints.

Next, a paint composition is prepared by uniformly blending the components shown in Formula C.

Formula C.—Acrylic latex house paint

| | Parts by weight |
|---|---|
| Formula A latex | 457.5 |
| Formula B pigment dispersion | 654.5 |
| Thickener, "Acrysol" ASE-60 | 5.3 |
| Polyethylenimine (molecular weight 1000–5000) | 3.7 |
| | 1121.0 |

"Acrysol" ASE-60 is a 28% aqueous solution of a water-soluble interpolymer of methyl methacrylate, ethyl acrylate, and acrylic acid, the latter making up about 35% of the polymer.

This acrylic latex paint has a brushing viscosity of 0.80 poises measured at a shear rate of 11,200 sec.$^{-1}$. The corresponding latex without the proper combination of thickener and polymeric aziridine has a brushing viscosity measured at the same shear rate of 0.45. This increase in brushing viscosity resulted in people applying 40% thicker coats of paint in laboratory panel tests. Other properties of the paint remained excellent as described below.

The resulting paint has a pigment volume concentration of about 30%, a pH of about 9, a density of about 11.2 pounds per gallon and a convenient can viscosity of about 74 Krebs units.

The clapboard siding on the exterior walls of a house is painted with one coat of the completed latex paint, using an ordinary paint brush. The house had been painted four years previously with a conventional oil-base primer and white topcoat. The old weathered paint film is scraped lightly to remove loose paint from cracked and blistered areas, and the bare areas are primed with a conventional oil-base exterior primer and allowed to dry prior to the latex paint application. The paint has excellent application properties on both the primed areas and the weathered film areas. The paint film is allowed to air dry and age under ordinary atmospheric conditions. The paint film on the house is examined at frequent intervals for a period of several months and is found to have excellent resistance to cracking and blistering and good retention of appearance in general.

EXAMPLE 2

The procedure of Example 1 can be followed except that polypropylenimine is substituted for the polyethylenimine. Similar results are obtained.

EXAMPLE 3

The procedures of Examples 1 and 2 can be followed except that "Thickener" LN and "Methocel" can be used in the following amounts:

"Thickener" LN: 0.6, 2.0 and 3.3 percent;
"Methocel": 0.5, 1.0 and 2.0 percent.

Similar results are obtained.

EXAMPLE 4

The procedure of Example 3 is followed using separately an amount of polyethylenimine and polypropylenimine with each of the combinations of thickeners set out in Example 3 in the following amounts: 0.2%, 0.5%, 1.0%, 2.0%, 3.0%, 4.0%.

EXAMPLE 5

Two 40% pigment volume concentration acrylic latex paints are prepared by the procedure of Example 1 using the ingredients listed below. One of these paints contains no polyethylenimine and is used as a control while the other paint is modified with polyethylenimine resin.

TABLE

| Component | Parts by weight of component | |
|---|---|---|
| | Control | Modified |
| Grind: | | |
| Water | 119.8 | 119.8 |
| "Tamol" 731 anonic dispersing agent | 7.5 | 7.5 |
| Potassium tripolyphosphate | 3.0 | 3.0 |
| Propylene glycol | 25.0 | 25.0 |
| "Colloid" 581B antifoamer | 2.0 | 2.0 |
| "Tri-Pure" R-902 titanium dioxide | 227.8 | 227.8 |
| "Ti-Pure" LW titanium dioxide | 19.3 | 19.3 |
| "Cellosize" 3% WP-4400 thickener solution | 49.9 | 49.9 |
| Water | 22.0 | 22.0 |
| "Asbestine" 325 magnesium silicate | 144.9 | 144.9 |
| "Celite" 281 diatomaceous silica | 25.0 | 25.0 |
| Mica minus 325 mesh water ground extender | 25.0 | 25.0 |
| "Metasol" 57 preservative | 3.0 | 3.0 |
| Reduction: | | |
| "Cellosize" 3% WP-4400 thickener solution | 59.9 | 59.9 |
| 55% solids emulsion of terpolymer of 88% vinyl acetate/11.6% ethylene/0.4% acrylic acid | 398.0 | 398.0 |
| "Montrek" 1000 polyethylenimine resin | | 6.0 |
| Water | 41.0 | 35.0 |
| Ammonia (28%) | 0.5 | 0.5 |

The trademarks or tradenames used above belong to the companies listed below:

| Trademark-Tradename | Company |
|---|---|
| "Tamol" | Rohm / Haas Co. |
| "Colloid" | Colloids, Inc. |
| "Ti-Pure" | E.I. du Pont de Nemours & Company |
| "Cellosize" | Union Carbide. |
| "Asbestine" | International Talc Co. |
| "Celite" | Johns Manville Co. |
| "Metasol" | Merck & Co. |
| "Montrek" | Dow Chemical Company. |

The control and modified paints were applied to primed beaverboard panels 1 foot by 2 feet at a standard spreading rate to insure adequate one-coat hiding. The percent weight increase after painting was determined and represents a relative assessment of the increase in brushing viscosity properties of the paints. The modified polyethylenimine paint showed a percentage of weight increase on the beaverboard panels of 23.5% over the control paint. The other properties of the modified paint were excellent.

What is claimed is:
1. An aqueous polymeric dispersion coating composition comprising:
   (a) a dispersed phase consisting essentially of a substantially water insoluable vinyl addition polymer containing from about 0.3% to about 10% by weight of $\alpha,\beta$-unsaturated monovinylidene carboxylic acid units, said polymer formed from monomers selected from the group consisting of acrylic acid, methacrylic acid, an alkyl ester of acrylic acid in which the alkyl group contains from 1–12 carbon atoms, an alkyl ester of methacrylic acid in which the alkyl group contains from 1–12 carton atoms, vinyl acetate and ethylene;
   (b) an aqueous dispersion medium;
   (c) a thickener selected from the group consisting of carboxy methyl cellulose, the ammonium salt of a polymer of vinyl methyl ether and maleic anhydride, polyacrylic acids and casein, said thickener present in the amount of from about 0.8% to about 2.3% by weight, based on the dispersed polymer; and
   (d) a polymeric aziridine compound selected from the group consisting of polyethyleneimine and polypropyleneimine, said polymeric aziridine compound present in the amount of from about 0.4% to about 3.0% by weight based on the dispersed polymer.

2. The composition of claim 1 which contains pigmentation in a pigment volume concentration of from about 4% to about 70%.

3. The composition of claim 2 which contains a surfactant present in an amount of at least about 0.05% by weight based on said dispersed polymer.

4. The composition of claim 1 wherein the carboxylic vinyl addition polymer contains from about 75% to about 97% by weight vinyl acetate and at least about 3% by weight ethylene, both percentages being based on the total weight of said carboxylic vinyl addition polymer.

5. The composition of claim 4 wherein the carboxylic acid units are supplied by methacrylic acid.

6. The composition of claim 4 wherein the carboxylic acid units are supplied by acrylic acid.

7. The composition of claim 4 wherein the carboxylic vinyl addition polymer contains from about 82% to about 89.7% by weight vinyl acetate, from about 10% to about 16% by weight ethylene and from about 0.3% to about 2% by weight acrylic acid.

8. The composition of claim 1 wherein the carboxylic vinyl addition polymer has pendant monovalent radicals attached to the carbon atoms in the polymer backbone, said pendant monovalent radicals being present in an amount of about 0.03% to about 3% by weight based on the carboxylic vinyl addition polymer and said pendant monovalent radicals being selected from the group consisting of radical A having the structural formula

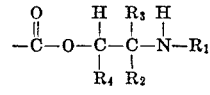

radical B having the structural formula

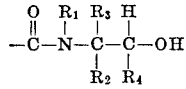

and a combination of radicals A and B wherein member $R_1$ is —H,
wherein the members $R_2$, $R_3$ and $R_4$ are individually selected from the group consisting of —H and —$CH_3$, and
wherein no more than 1 of the members $R_2$, $R_3$ or $R_4$ is —$CH_3$.

9. The composition of claim 8 wherein the $\alpha,\beta$-unsaturated monovinylidene carboxylic acid units are present in an amount of from about 1% to about 5% by weight and the pendant monovalent radicals are present in an amount of from about 0.1% to about 1% by weight, both percentages being based on said dispersed polymer.

References Cited

UNITED STATES PATENTS

| | | | |
|---|---|---|---|
| 2,933,416 | 4/1960 | Haakh et al. | 260—269.R |
| 3,113,038 | 12/1963 | Lattarulo et al. | 260—29.6TA |
| 3,238,171 | 3/1966 | Wolff et al. | 260—29.6R |
| 3,251,778 | 5/1966 | Dickson et al. | 260—2 EN |

MURRAY TILLMAN, Primary Examiner

H. ROBERTS, Assistant Examiner

U.S. Cl. X.R.

117—32, 148, 167; 260—2, 17, 29.6, 874, 897, 901